June 18, 1935. W. BARRETT 2,005,489
ANIMAL TRAP
Filed June 11, 1934

Inventor
William Barrett
By Lynn H. Latta
Attorney

Patented June 18, 1935

2,005,489

UNITED STATES PATENT OFFICE 2,005,489

ANIMAL TRAP

William Barrett, Hinton, Iowa

Application June 11, 1934, Serial No. 729,980

8 Claims. (Cl. 43—80)

My invention relates to a trap for catching animals of the mink type or about that size.

My invention comprises improvements made over that type of invention set forth in my co-pending application, Serial No. 679,526, filed July 8, 1933.

An object of my invention is to provide a trap which will firmly ensnare the animal.

Another object of my invention is to provide a trap having humane characteristics of practically immediately killing the animal when caught.

Another object of my invention is to provide a simple tripping mechanism which will operate positively without getting out of order.

A further object of my invention is to provide a trap of this character which can be manufactured at a very reasonable cost.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1:
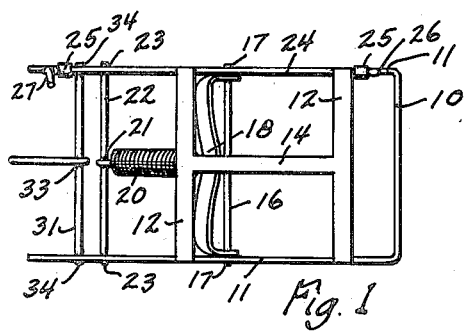
Figure 1 is a plan view of the trap before setting.

I have used the character 10 to indicate generally the U shaped base of the trap which has the sides 11. Extending upwardly from the sides 11 are the upstanding approximately U shaped bars 12 which are spaced apart as shown, and which join the side pieces 13.

Located centrally between the members 12 is the central bar 14. This entire cage like structure can be formed integrally or otherwise, if desired.

The jaw 15 is pivoted about the rod 16, which rod passes through the sides 11 at 17. The jaw 15 is bent inwardly at its outer extremity at 18, leaving the approximately arcuate portions 19 at the sides. This jaw is preferably formed from a single bent strip of metal.

Attached at 18 is the coiled spring 20 which is attached at 21 to the further rod 22, which passes through the sides 11 at 23.

The trigger device includes the setting member 24 which is a round rod which passes through the clips 25, which clips are attached to one of the members 11. The rod 24 is thus positioned directly above the member 11. The member 24 further terminates in the outwardly bent extremity 26 at the front of the trap and the further extremity 27 which is also outwardly bent as shown and which terminates in the extension 28.

The trip member comprises the stiff wire or rod 29 which is bent into the pointed member 30 at the extremity thereof. The member 29 is looped about the rod 31 and then terminates into the further bentover member 32. The looped portion is solidly affixed to the rod 31 at 33 by welding or soldering, and the rod 31 is suitably journalled in the members 11 at 34.

Figure 2:
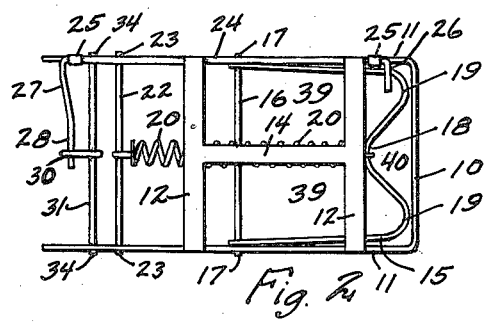
Figure 2 is a plan view of the trap after setting.

In setting the trap as shown at Figure 2, the jaw 15 is forced downwardly to a horizontal position, and will then lie within the sides of the U shaped member 10. The jaw will then be under a great tension.

The setting rod 24 is swung downwardly so that the ends 26 and 27 lie horizontally. The end 26 will then retain the jaw in the open position, and the extremity 28 of the member 27 will then underlie the bent portion 32, which portion is an integral extension of the bait carrying member 29. The pressure by the jaw against the member 26 will tend to force the portion 28 firmly and upwardly against the portion 32, which is slightly bent to insure a positive retention therein.

The bait (see Figure 5) 35 is impaled on the point 30, and the arrangement is now ready for trapping the animal.

The trap is usually placed within a hole, such as 36, which is dug in the side of a mound or hill, or which, if desired, can be dug at an angle from a flat surface. The trap is placed within the hole as shown in Figure 5, and, if desired, a small stake 37 can be driven into the ground and attached to the trap by means of a small chain 38.

Figure 5:
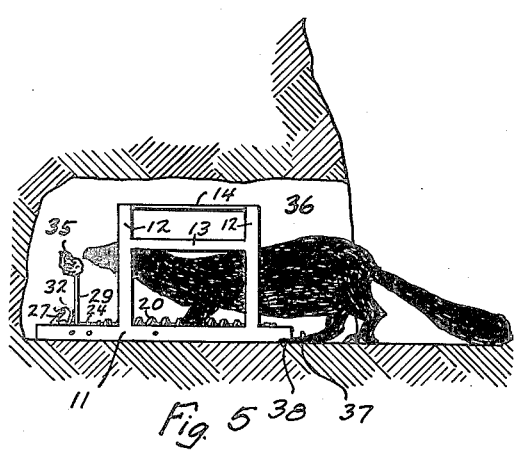
Figure 5 is a general view showing the animal entering the trap.

The animal enters the trap as shown approximately in Figure 5, and begins to tear at the bait. It will be noted that the animal's front feet are within the spaces 39 (see Figure 2) when nibbling on the bait 35.

Figure 3:
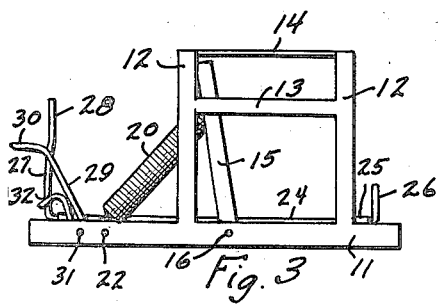
Figure 3 is a side elevation of Figure 1.
Figure 4:
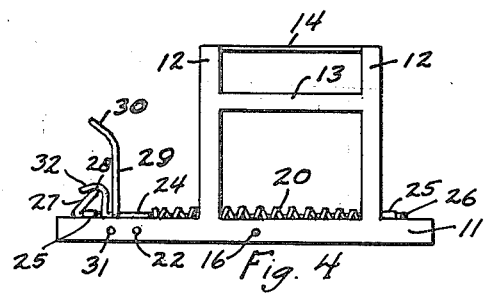
Figure 4 is a side elevation of Figure 2.
Figure 6:
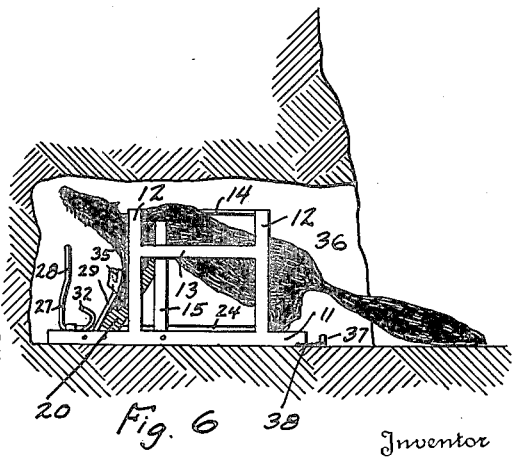
Figure 6 is a similar view showing the animal caught.

The natural tendency for the animal is to pull the bait off of the hook 30, and the creature will instinctly pull rearwardly on the bait, while backing out of the hole. As soon as the member 29 is pulled a slight distance rearwardly, the member 32 will be pulled clear of the member 28. The member 26 and 27 will then automatically fly to the vertical position as shown in Figures 3 and 6, since the spring urged jaw forces the member 26 to the vertical position also. The jaw will then fly upwardly, catching the animal directly behind the front feet as shown in Figure 6 and within the opening 40 (see Figure 2) formed at the end of the jaw.

The body of the animal will be constricted against the top bar 14 in a restricted area, and the creature will be immediately suffocated by this means. The shoulders will be forced slightly above the cross bar 14 as shown in Figure 6.

The spring 20 is made of sufficient strength to insure a rapid action of the jaw so that the action will be instantaneous.

It will be noted that the trigger device and the parts associated therewith are positioned to one side of the path of the animal in entering the trap. This insures the trap will not be sprung prematurely, and also insures an efficient action of the same.

It will now be seen that I have provided a trap for catching animals which will firmly ensnare the animal, which will immediately kill the animal, associated with a tripping mechanism which is efficient and which will not get out of order or hinder the entrance of the animal.

It will also be seen that I have provided these features in a construction of great simplicity.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. An animal trap comprising a frame including a pair of upstanding inverted U shaped members, a cross bar between the upper ends of the members, a spring urged jaw adapted to swing upwardly within the frame, a setting member pivotally attached at one side of the frame adapted to overlap and retain the jaw when opened and trigger means co-acting with said setting memer for releasing the jaw.

2. An animal trap comprising a frame including a pair of upstanding inverted U shaped members, a cross bar between the upper ends of the members, a spring urged jaw adapted to swing upwardly within the frame, a setting member pivotally attached at one side of the frame adapted to overlap and retain the jaw when opened, said setting member including an outer inwardly bent extension for retaining the said jaw when positioned horizontally and trigger means co-acting with said setting member for releasing the jaw.

3. An animal trap comprising a frame including a pair of upstanding inverted U shaped members, a cross bar between the upper ends of the members, a spring urged jaw adapted to swing upwardly within the frame, a setting member pivotally attached at one side of the frame adapted to overlap and retain the jaw when opened, said setting member including an outer inwardly bent extension for retaining the said jaw when positioned horizontally, and an inner inwardly bent extension, and means for releasing the inner extension.

4. An animal trap comprising a frame including a pair of upstanding inverted U shaped members, a cross bar between the upper ends of the members, a spring urged jaw adapted to swing upwardly within the frame, a setting member pivotally attached at one side of the frame adapted to overlap and retain the jaw when opened, said setting member including an outer inwardly bent extension for retaining the said jaw when positioned horizontally, and an inner inwardly bent extension, and means for releasing the inner extension, including a bait receiving trigger including a bent over extension adapted to overlie the said inner extension to cause retention thereof.

5. An animal trap comprising a frame including a pair of upstanding inverted U shaped members, a cross bar between the upper ends of the members, a spring urged jaw adapted to swing upwardly within the frame, a setting member pivotally attached at one side of the frame adapted to overlap and retain the jaw when opened, said setting member including an outer inwardly bent extension for retaining the said jaw when positioned horizontally, and an inner inwardly bent extension, and means for releasing the inner extension, including a bait receiving trigger including a bent over extension adapted to overlie the said inner extension to cause retention thereof, said bait receiving trigger being pivotally positioned at the inner center of the trap.

6. An animal trap comprising a frame including a pair of upstanding inverted U shaped members, a cross bar between the upper ends of the members, a spring urged jaw adapted to swing upwardly within the frame, a setting member pivotally attached at one side of the frame adapted to overlap and retain the jaw when opened, said setting member including an outer inwardly bent extension for retaining the said jaw when positioned horizontally, and an inner inwardly bent extension, and means for releasing the inner extension, including a bait receiving trigger including a bent over extension adapted to overlie the said inner extension to cause retention thereof, said spring-urged jaw including an inwardly indented outer end adapted to receive and compress an animal's body when the said jaw is closed.

7. An animal trap comprising a frame including a pair of upstanding inverted U shaped members, a cross bar between the upper ends of the members, a spring urged jaw adapted to swing upwardly within the frame, a setting member pivotally attached at one side of the frame adapted to overlap and retain the jaw when opened, said setting member including an outer inwardly bent extension for retaining the said jaw when positioned horizontally, and an inner inwardly bent extension, and means for releasing the inner extension, including a bait receiving trigger including a bent over extension adapted to overlie the said inner extension to cause retention thereof, said spring-urged jaw including an inwardly indented outer end adapted to receive and compress an animal's body when the said jaw is closed, said frame including an inner rod, and a spring attached to and between the rod and the said indent.

8. An animal trap comprising a frame, an upwardly movable spring urged jaw pivotally mounted within the frame, a setting bar pivotally mounted at one side of the frame, said setting bar including inwardly extending extremities, one of which retains the jaw in open position, and a trigger mounted within the frame adapted to retain the other extension.

WILLIAM BARRETT.